(12) United States Patent
Managan, II et al.

(10) Patent No.: US 10,836,568 B2
(45) Date of Patent: *Nov. 17, 2020

(54) BLENDER HOPPER CONTROL SYSTEM FOR MULTI-COMPONENT GRANULAR COMPOSITIONS

(71) Applicant: Solaris Oilfield Site Services Operating LLC, Houston, TX (US)

(72) Inventors: William Vaughn Managan, II, Rochelle, TX (US); Joe Daniel Matkowski, San Angelo, TX (US); Bryan Scott Lambert, The Woodlands, TX (US); Kelly Lee Price, Magnolia, TX (US)

(73) Assignee: SOLARIS OILFIELD SITE SERVICES OPERATING LLC, Houston, TX (US)

( * ) Notice: Subject to any disclaimer, the term of this patent is extended or adjusted under 35 U.S.C. 154(b) by 55 days.

This patent is subject to a terminal disclaimer.

(21) Appl. No.: 16/392,435

(22) Filed: Apr. 23, 2019

(65) Prior Publication Data
US 2019/0248578 A1 Aug. 15, 2019

Related U.S. Application Data

(60) Continuation-in-part of application No. 15/287,523, filed on Oct. 6, 2016, now Pat. No. 10,300,830, which
(Continued)

(51) Int. Cl.
*B65D 88/54* (2006.01)
*B65G 65/42* (2006.01)
(Continued)

(52) U.S. Cl.
CPC .............. *B65D 88/54* (2013.01); *B01F 3/188* (2013.01); *B01F 13/1002* (2013.01);
(Continued)

(58) Field of Classification Search
CPC ........ B65D 88/54; B65D 90/02; B65D 88/30; B01F 13/1002; B01F 15/00136;
(Continued)

(56) References Cited

U.S. PATENT DOCUMENTS

| 2,606,676 A | 8/1952 | Dempster |
| 2,642,979 A | 6/1953 | Beech |

(Continued)

FOREIGN PATENT DOCUMENTS

| CA | 2653370 A1 | 8/2010 |
| DE | 1274989 B | 8/1968 |

(Continued)

*Primary Examiner* — Tony G Soohoo
(74) *Attorney, Agent, or Firm* — Elizabeth R. Hall & Associates, P.C.; Elizabeth R. Hall

(57) ABSTRACT

Embodiments of the present invention include a method and system for controlling the flow rate of materials into and out of the blender. The system includes the control and management of an on-site storage system for each component of a mixture, regulating the delivery rate of a blend mixture into a blender hopper, regulating the exit rate of the blended mixture from the blender hopper, and coordinating the flow of materials into and out of the blender.

20 Claims, 5 Drawing Sheets

Related U.S. Application Data is a continuation-in-part of application No. 14/557,832, filed on Dec. 2, 2014, now Pat. No. 9,499,335, which is a division of application No. 13/658,551, filed on Oct. 23, 2012, now Pat. No. 8,926,252.

(60) Provisional application No. 61/661,044, filed on Jun. 18, 2012, provisional application No. 61/550,776, filed on Oct. 24, 2011.

(51) Int. Cl.
  *B65D 90/02* (2019.01)
  *B65D 88/30* (2006.01)
  *B60P 1/48* (2006.01)
  *B60P 3/00* (2006.01)
  *B60P 1/64* (2006.01)
  *B65G 65/40* (2006.01)
  *G01D 11/00* (2006.01)
  *B01F 13/10* (2006.01)
  *B01F 15/00* (2006.01)
  *B01F 3/18* (2006.01)
  *B01F 13/00* (2006.01)

(52) U.S. Cl.
  CPC .... *B01F 15/0037* (2013.01); *B01F 15/00136* (2013.01); *B60P 1/483* (2013.01); *B60P 1/6418* (2013.01); *B60P 1/6427* (2013.01); *B60P 3/00* (2013.01); *B65D 88/30* (2013.01); *B65D 90/02* (2013.01); *B65G 65/40* (2013.01); *B65G 65/42* (2013.01); *G01D 11/00* (2013.01); *B01F 13/0035* (2013.01); *B01F 2215/0081* (2013.01); *B01F 2215/045* (2013.01)

(58) Field of Classification Search
  CPC .................. B01F 15/0037; B01F 3/188; B01F 2215/045; B01F 2215/0081; B01F 13/0035; G01D 11/00; B65G 65/42; B65G 65/40; B60P 1/483; B60P 3/00; B60P 1/6427; B60P 1/6418; B60P 1/00
  See application file for complete search history.

(56) References Cited

U.S. PATENT DOCUMENTS

| | | |
|---|---|---|
| 2,808,164 A | 10/1957 | Glendinning |
| 3,151,849 A | 10/1964 | Maxon, Jr. |
| 3,160,289 A | 12/1964 | Leefer |
| 3,208,616 A | 9/1965 | Haskins |
| 3,313,435 A | 4/1967 | Welk |
| 3,314,557 A | 4/1967 | Sackett, Sr. |
| 3,343,688 A | 9/1967 | Ross |
| 3,415,498 A | 12/1968 | Zaccaron |
| 3,448,866 A | 6/1969 | Perry et al. |
| 3,547,291 A | 12/1970 | Dempster |
| 3,618,801 A | 11/1971 | Blanchard |
| 3,622,026 A | 11/1971 | Tornheim |
| 3,666,129 A | 5/1972 | Haskins |
| 3,687,319 A | 8/1972 | Adam et al. |
| 3,848,758 A | 11/1974 | Carter |
| 3,934,739 A | 1/1976 | Zumsteg et al. |
| 3,963,149 A | 6/1976 | Fassauer |
| 3,985,254 A | 10/1976 | Grandury |
| 4,111,314 A | 9/1978 | Nelson |
| 4,163,626 A | 8/1979 | Batterton et al. |
| 4,265,266 A | 5/1981 | Kierbow et al. |
| 4,337,014 A | 6/1982 | Farnham |
| 4,392,567 A | 7/1983 | Glebov |
| 4,453,878 A | 6/1984 | Paukku |
| 4,465,420 A | 8/1984 | Dillman |
| 4,561,821 A | 12/1985 | Dillman |
| 4,621,972 A | 11/1986 | Grotte |
| 4,626,166 A | 12/1986 | Jolly |
| 4,634,335 A | 1/1987 | Van Den Pol |
| 4,643,292 A | 2/1987 | Whited |
| 4,708,569 A | 11/1987 | Nijenhuis |
| 4,755,097 A | 7/1988 | Corompt |
| 4,775,275 A | 10/1988 | Perry |
| 4,810,159 A | 3/1989 | Stegmuller |
| 4,855,960 A | 8/1989 | Janssen et al. |
| 4,944,646 A | 7/1990 | Edwards et al. |
| 4,963,070 A | 10/1990 | Detrick |
| 4,986,719 A | 1/1991 | Galbreath |
| 5,044,861 A | 9/1991 | Kirchhoff et al. |
| 5,082,416 A | 1/1992 | Bock |
| 5,102,284 A | 4/1992 | Raisio |
| 5,108,247 A | 4/1992 | Vlaanderen |
| 5,163,800 A | 11/1992 | Raisio |
| 5,281,023 A | 1/1994 | Cedillo et al. |
| 5,441,340 A | 8/1995 | Cedillo et al. |
| 5,542,807 A | 8/1996 | Kruzick |
| 5,775,803 A * | 7/1998 | Montgomery ......... G05D 21/02 366/152.2 |
| 5,775,852 A | 7/1998 | Boutte |
| 5,957,331 A | 9/1999 | Minor |
| 6,276,516 B1 | 8/2001 | Bagust |
| 6,474,926 B2 | 11/2002 | Weiss |
| 6,672,342 B2 | 1/2004 | Nussbaumer |
| 6,869,261 B2 | 3/2005 | Burke |
| 7,214,028 B2 | 5/2007 | Boasso et al. |
| 7,278,816 B2 | 10/2007 | Marmur et al. |
| 7,341,419 B1 | 3/2008 | Fink et al. |
| 7,712,632 B2 | 5/2010 | Schwass |
| 8,142,134 B2 | 3/2012 | Lavoie et al. |
| 8,319,680 B2 | 11/2012 | Sai |
| 8,534,452 B2 | 9/2013 | Furuyama |
| 8,573,917 B2 | 11/2013 | Renyer |
| 8,585,341 B1 | 11/2013 | Oren |
| 8,651,792 B2 | 2/2014 | Friesen |
| 8,944,740 B2 | 2/2015 | Teichrob |
| 9,038,865 B2 | 5/2015 | Naizer |
| 9,150,349 B2 | 10/2015 | Hall |
| 9,938,093 B2 * | 4/2018 | Sherwood ............ B65G 11/146 |
| 10,300,830 B2 * | 5/2019 | McIver ............ B01F 15/00155 |
| 2003/0202869 A1 | 10/2003 | Posch |
| 2005/0244256 A1 | 11/2005 | Barry |
| 2005/0260062 A1 | 11/2005 | Boasso et al. |
| 2007/0207017 A1 | 9/2007 | Boasso et al. |
| 2008/0210093 A1 * | 9/2008 | Snowdon ............... B65G 53/60 95/284 |
| 2008/0236818 A1 * | 10/2008 | Dykstra ................ E21B 43/267 166/252.1 |
| 2010/0071284 A1 | 3/2010 | Hagan et al. |
| 2010/0196130 A1 | 8/2010 | Lavoie et al. |
| 2012/0024738 A1 | 2/2012 | Herman et al. |
| 2012/0099954 A1 * | 4/2012 | Teichrob ................ B65G 67/36 414/332 |
| 2012/0145262 A1 * | 6/2012 | Meier .................... B65G 65/32 137/565.17 |
| 2012/0219391 A1 * | 8/2012 | Teichrob ................ B65G 67/40 414/293 |
| 2012/0298478 A1 | 11/2012 | Friesen |
| 2013/0048148 A1 * | 2/2013 | Matye ..................... B65B 1/06 141/99 |
| 2013/0108402 A1 | 5/2013 | Herman et al. |
| 2013/0265843 A1 * | 10/2013 | Matye .................... B28C 7/064 366/8 |
| 2013/0309052 A1 | 11/2013 | Luharuka |
| 2013/0322995 A1 | 12/2013 | Lopes |
| 2014/0023465 A1 | 1/2014 | Oren |
| 2014/0044507 A1 | 2/2014 | Naizer |
| 2014/0044508 A1 | 2/2014 | Luharuka |
| 2014/0305769 A1 | 10/2014 | Eiden, III |
| 2015/0044003 A1 | 2/2015 | Pham |
| 2015/0044004 A1 | 2/2015 | Pham |
| 2015/0166260 A1 | 6/2015 | Pham |
| 2015/0320235 A1 | 11/2015 | Carlson |

(56) References Cited

U.S. PATENT DOCUMENTS

2015/0360856 A1   12/2015  Oren
2019/0248578 A1\*  8/2019  Managan, II .......... B65G 65/42

FOREIGN PATENT DOCUMENTS

| DE | 3329412 A1 | 2/1985 |
|----|-----------|--------|
| DE | 4019618 A1 | 1/1991 |
| DE | 4108162 A1 | 9/1992 |
| DE | 418225 U1 | 1/1995 |
| DE | 19513864 A1 | 10/1996 |
| EP | 1142755 A2 | 10/2001 |
| FR | 1370103 A1 | 8/1964 |
| FR | 1486478 A | 6/1967 |
| GB | 934113 A | 8/1963 |
| JP | 57164825 A | 10/1982 |
| JP | 61181733 A | 8/1986 |

\* cited by examiner

BLENDER HOPPER CONTROL SYSTEM FOR MULTI-COMPONENT GRANULAR COMPOSITIONS

CROSS-REFERENCE TO RELATED APPLICATIONS

The present application is a continuation-in-part to and claims priority under 35 U.S.C. 120 to U.S. patent application Ser. No. 15/287,523 filed Oct. 6, 2016, which is a continuation-in-part to and claims priority under 35 U.S.C. 120 to U.S. Pat. No. 9,499,335 filed Dec. 2, 2014, which is a divisional of and claims priority under 35 U.S.C. 120 to U.S. Pat. No. 8,926,252 filed Oct. 23, 2012, each of which are hereby incorporated by reference in their entireties.

BACKGROUND OF THE INVENTION

Field of the Invention

The present invention relates to systems and methods for controlling the entry rate into a hopper and the exit rate of materials from the hopper at a remote blending site for large quantities of multi-component granular compositions. In particular, the present invention relates to a system for regulating the delivery rate of a blend mixture into a blender hopper, regulating the exit rate of the blended mixture from the blender hopper, and coordinating the flow of materials into and out of the blender hopper.

Description of the Related Art

Granular materials, such as sand, are used in bulk quantities in a number of applications. For example, mining companies sometimes make use of a technique termed "hydraulic fracturing" to aid in the extraction of fossil fuels from well sites. Hydraulic fracturing is the propagation of fractures in a rock layer caused by the presence of a pressurized fluid. Hydraulic fractures form naturally, as in the case of veins or dikes, and is one means by which gas and petroleum from source rocks may migrate to reservoir rocks.

In some cases, oil and gas companies may attempt to accelerate this process in order to release petroleum, natural gas, coal seam gas, or other substances for extraction, where the technique is often called "fracking" or "hydrofracking." This type of fracturing is done from a wellbore drilled into reservoir rock formations. The energy from the injection of a highly-pressurized fracking fluid creates new channels in the rock which can increase the extraction rates and ultimate recovery of fossil fuels. When done in already highly-permeable reservoirs such as sandstone-based wells, the technique is known as well stimulation. Operators typically try to maintain fracture width or slow its decline following treatment by introducing a proppant into the injected fluid. A proppant is a material, such as grains of sand, ceramic, or other particulates, that prevents the fractures from closing when the injection is stopped. Consideration of proppant strengths and prevention of proppant failure becomes more important at deeper depths where pressure and stresses on fractures are higher.

Hydraulic fracturing, often performed in remote areas, uses large amounts of granular material that must be shipped into the site. The large amount of granular material required in a fracking operation at a well site requires that these materials be stored close to the well site so that they may be used as needed. Usable storage space at well and drilling sites is frequently very limited due to the terrain at the well sites or other factors related to the inaccessibility of the sites. As a result, storage space for materials necessary for drilling and mining operations is often at a premium. Improving the efficiency and use of storage space at drilling and well sites can have important economic as well as practical benefits for drilling and mining operations.

Typically, tractor trailer rigs are used to transport these materials to well sites. If no or insufficient storage space is available at the well site, it is oftentimes necessary to store the materials in the same tractor trailer rigs that delivered the materials to the well site. This is an inefficient and frequently cost-prohibitive solution to the storage problem because the trailers must be parked until needed. This is costly because the drivers and their trucks are forced to waste valuable time out of service. Thus, the efficient storage of materials at oil and natural gas well sites is a critical factor in the successful implementation of fracking operations.

In addition, to the need for an efficient on-site storage system, there is an existing need for a means to efficiently control the mixing of the stored granular material to produce a prescribed blend of materials to form the desired proppant including systems and methods for regulating the delivery rate of a blend mixture into a blender hopper, regulating the exit rate of the blended mixture from the blender hopper into the blender, and coordinating the flow of materials into and out of the blender hopper.

SUMMARY OF THE INVENTION

The present invention relates to systems and methods for controlling the entry rate into a hopper and the exit rate of materials from the hopper at a remote blending site for large quantities of multi-component granular compositions. In particular, the present invention relates to a system for regulating the delivery rate of a blend mixture into a blender hopper, regulating the exit rate of the blended mixture from the blender hopper, and coordinating the flow of materials into and out of the blender hopper.

One embodiment of the present invention is a blending system that has (a) a hopper that blends at least two granular ingredients into a blend mixture; (b) a blender that blends the blend mixture received from the hopper with a liquid to form a fracturing fluid slurry; (c) a plurality of storage containers, each container equipped with a storage container monitoring device that dynamically monitors a level, mass or amount of an ingredient contained in that storage container, wherein at least one storage container contains each ingredient of the blend mixture; (d) a central feeder oriented such that a first end of the central feeder is positioned to deliver the ingredients of the blend mixture directly into the hopper; (e) an ingredient feeder designated for each ingredient in the blend mixture, each ingredient feeder oriented to deliver the ingredient exiting from one storage container to the central feeder; (f) a plurality of ingredient feeder regulators, wherein one ingredient regulator controls the rate of delivery of each ingredient feeder from its ingredient feeder to the central feeder; (g) a central regulator that controls the speed of the central feeder and the rate of delivery of the ingredients from the central feeder into the hopper; (h) a hopper inflow monitor positioned at the first end of the central feeder to measure an amount of blend ingredients entering the hopper; (i) a variable hopper outflow dispenser that delivers the blend mixture into a blender; (j) a hopper outflow regulator that controls an exit rate of the blend mixture from the hopper by controlling a speed of the hopper outflow dispenser, wherein the exit rate of the blend mixture from the hopper is regulated by the amount of liquid entering the blender and an amount of fracturing fluid slurry exiting the blender; and (k) a hopper control system in communication with the storage container monitoring devices, the feeder regulators dynamically regulated by the hopper control system, the hopper inflow monitor, and the hopper outflow regulator, wherein the hopper control system matches the delivery rate of each of the ingredients into the hopper proportionately with the designated percentage of that ingredient within the blend mixture and matches the delivery rate of the blend mixture into the hopper with the exit rate of the blend mixture from the hopper.

Another embodiment of the blending system includes (a) a hopper that blends at least two ingredients into a blend mixture; (b) a flat platform positioned on a ground surface and configured for a trailer to drive upon; (c) a plurality of storage containers, each container vertically positioned on the platform on a set of legs and equipped with a storage container monitoring device that dynamically monitors a level, mass or amount of an ingredient contained in that storage container and a discharge exit port oriented on a lower end of the container toward the platform and among the legs, wherein at least one storage container contains each ingredient of the blend mixture; (d) a choke gate mounted on the exit port of each container, wherein an adjustable opening of the choke gate controls a discharge rate of the ingredient through the exit port of each container; (e) a central feeder oriented proximal to and parallel to the platform, wherein the blender is positioned at a first end of the central feeder such that the central feeder delivers the ingredients of the blend mixture into the blender; (f) at least one ingredient feeder designated for each ingredient in the blend mixture, each ingredient feeder mounted below one container choke gate and oriented to deliver the ingredient exiting from the choke gate of that storage container to the central feeder; (g) a central regulator that regulates a variable delivery rate of the blend mixture from the central feeder into the blender; (h) a plurality of ingredient regulators, with at least one ingredient regulator designated for each ingredient feeder, where each ingredient regulator regulates a variable delivery rate of the ingredient from its ingredient feeder to the central feeder; (i) a hopper monitor positioned at the first end of the central feeder wherein the hopper monitor measures a level, mass or amount of the blend mixture entering the blender or within the blender; (j) an adjustable hopper outflow dispenser that varies an exit rate of the blend mixture from the hopper wherein the exit rate of the blend mixture from the hopper is regulated based on the amount of granular material required to match the entry rate of fluid into the blender and a programmable setpoint of solid/fluid ratio in the blender; and (k) a control system in communication with the hopper monitor, the hopper outflow dispenser, the storage container monitoring devices, each ingredient feeder regulator, and the central feeder regulator, wherein the control system is configured to dynamically balance the delivery rate of the blend mixture into the hopper with the exit rate of the blend mixture from the hopper and to regulate each ingredient feeder regulator to adjust the delivery rate of each of the ingredients onto the central feeder to equal a designated percentage of that ingredient within the blend mixture.

Yet another embodiment of the invention is a method for balancing the inflow and outflow of material into and out of a hopper during a fracking job comprising: (a) providing the hopper with a hopper inflow monitor positioned proximal an entrance to the hopper; (b) measuring a mass or amount of granular material entering the hopper; (c) providing the hopper with a regulatable hopper outflow dispenser that delivers the granular material from the hopper to a blender; (d) measuring a mass or amount of granular material required by the blender to produce a set amount of fracturing slurry to pump into a well; (e) regulating the hopper outflow dispenser to deliver the mass or amount of granular material required by the blender from the hopper to the blender; (e) balancing the mass or amount of granular material entering the hopper with the mass or amount of material delivered to the blender.

The foregoing has outlined rather broadly several aspects of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed might be readily utilized as a basis for modifying or redesigning the structures for carrying out the same purposes as the invention. The foregoing has outlined rather broadly several aspects of the present invention in order that the detailed description of the invention that follows may be better understood.

BRIEF DESCRIPTION OF THE DRAWINGS

Appended

FIG. 1 is a schematic illustration of one embodiment of a storage and blending system.

FIG. 2 depicts a modular storage and blending system having an arrangement of six silos positioned vertically on two separate base platforms with a central conveyor between the two platforms.

FIG. 3 is a schematic representation of one embodiment of a storage and blending system.

FIG. 4 is a flowchart illustrating a process for monitoring the content levels within the silos.

FIG. 5 is a flowchart illustrating one embodiment of a blender hopper control system.

DESCRIPTION OF THE PREFERRED EMBODIMENTS

The present invention relates to systems and methods for controlling the entry rate of material into a hopper and the exit rate of materials from the hopper at a remote blending site for large quantities of multi-component granular compositions. In particular, the present invention relates to a system for regulating the delivery rate of a blend mixture into a blender hopper, regulating the exit rate of the blended mixture from the blender hopper, and coordinating the flow of materials into and out of the blender hopper.

Unless specifically defined herein, all technical and scientific terms used have the same meaning as commonly understood by one of ordinary skill in the art to which this invention belongs. The term "granular material" is used to define a flowable material comprising solid macroscopic particles, such as sand, gravel, or the like. The term "proppant" is used to define a granular material used in drilling, for example by oil and gas industries. Proppant comprises appropriately sized and shaped particles which may be mixed with fracturing fluid for use in a hydraulic fracturing treatment. A proppant is a material such as naturally occurring grains of sand of a predetermined size, or engineered materials, such as resin-coated sand, ceramic materials, sintered bauxite, or the like.

As used herein, the term "about" refers to a +/−10% variation from the nominal value. It is to be understood that such a variation is always included in a given value provided herein, whether or not it is specifically referred to.

As used herein, the term "component" is used interchangeably with the term "ingredient."

Figure 1:
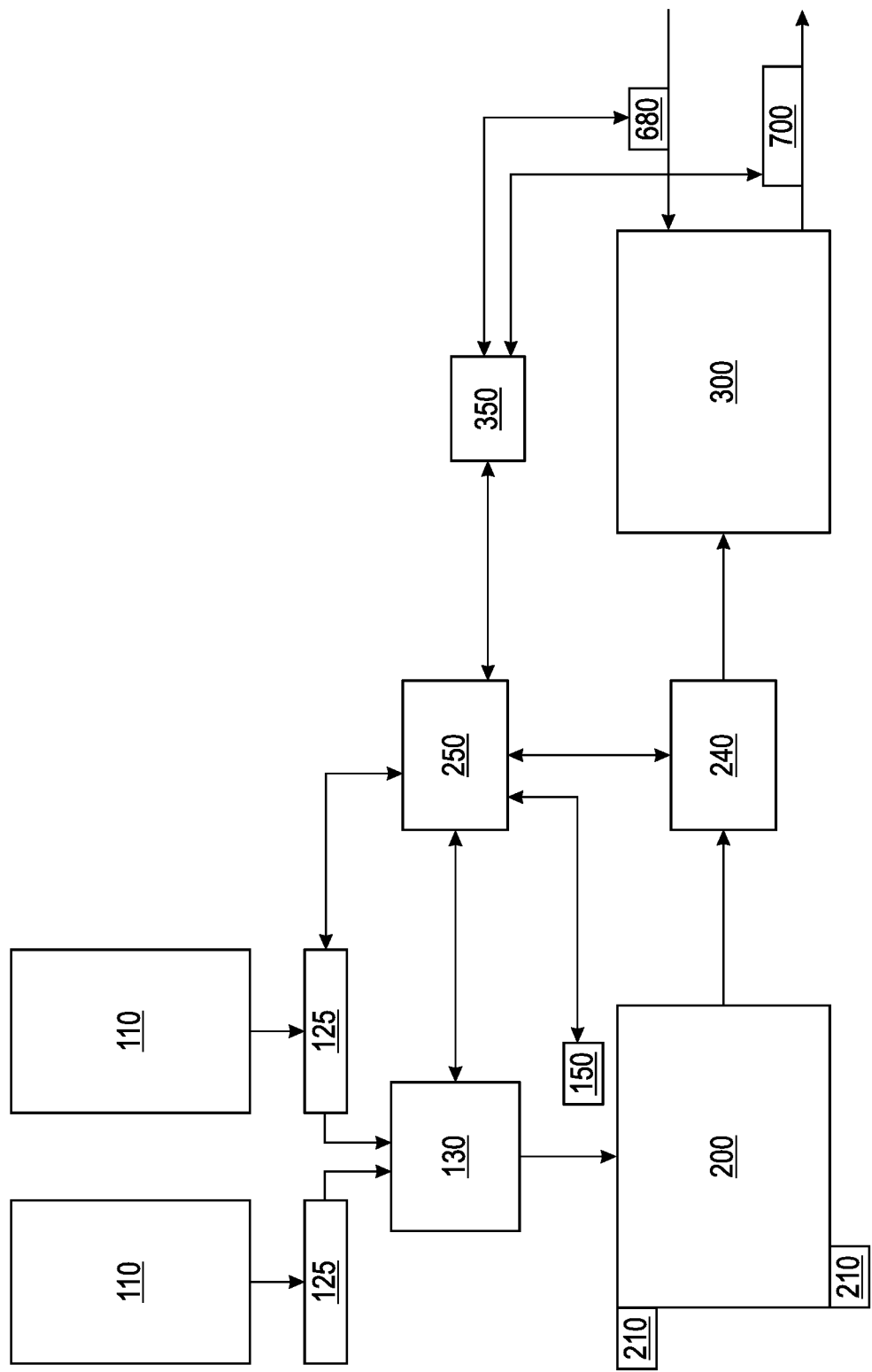
FIGS. 1-5 depict certain non-limiting embodiments of the storage and blending system and related systems. The figures are not intended to limit the scope of the invention but, instead, are intended to provide depictions of specific embodiments, features and non-limiting characteristics of the systems described herein. The accompanying figures further illustrate the present invention. The components of an embodiment shown in the drawings are not necessarily drawn to scale, emphasis instead being placed upon clearly illustrating the principles of the present invention.

One aspect of the storage and blending system for multi-component granular materials as described herein is schematically shown in FIG. 1. This embodiment includes storage containers 110 for storing components or ingredients of the multi-component composition on-site, a primary or central feeder 130 for feeding materials into the blender hopper 200, and one or more secondary feeders 125 for dispensing predetermined quantities of designated ingredients from their storage container 110 to the central feeder 130. The inflow of material into the blender hopper (also referred to herein as the hopper) 200 is monitored real time with a hopper inflow monitor 150. The outflow of material from the blender hopper 200 is governed by a regulatable outflow dispenser 240 that feeds the solid materials blended in the blender hopper into the blender 300. The overall coordination and control of the inflow and outflow of material into and out of the blender hopper 200 is managed by the blender hopper controller 250.

The rate of inflow of dry material and fluids into the blender is controlled by a blender controller 350. The rate of inflow of dry material into the blender 300 is based on the entry rate of fluid into the blender, as measured by a blender fluid flow meter 680, and a programmable setpoint of solid/fluid ratio. The blender then blends the incoming granular material and fluid to form a fracturing fluid slurry that is used at the job site (e.g., pumped into a well). The outflow of the fracturing fluid slurry is monitored by a fracturing slurry outflow meter 700. Thus, the blender controller 350 coordinates the outflow of slurry from the blender with the inflow of fluids and dry granular materials into the blender.

The overall coordination and control of the inflow and outflow of material into and out of the blender hopper 200 is important to the smooth operation of the whole storage and management system and is managed by the blender hopper controller 250. The blender hopper controller 250 balances and coordinates the inflow of material into the blender hopper with the outflow of material from the blender hopper 200 into the blender, which is balanced with the outflow of the blended fracturing slurry and the inflow of liquid materials into the blender 300.

The hopper controller is in communication with the storage container monitoring devices, the feeder regulators that are dynamically regulated by the hopper control system, the hopper inflow monitor, and the hopper outflow regulator, wherein the hopper controller matches the delivery rate of each of the ingredients into the hopper proportionately with the designated percentage of that ingredient within the blend mixture and matches the delivery rate of the blend mixture into the hopper with the exit rate of the blend mixture from the hopper.

Storage of Materials at the Site

Figure 2:
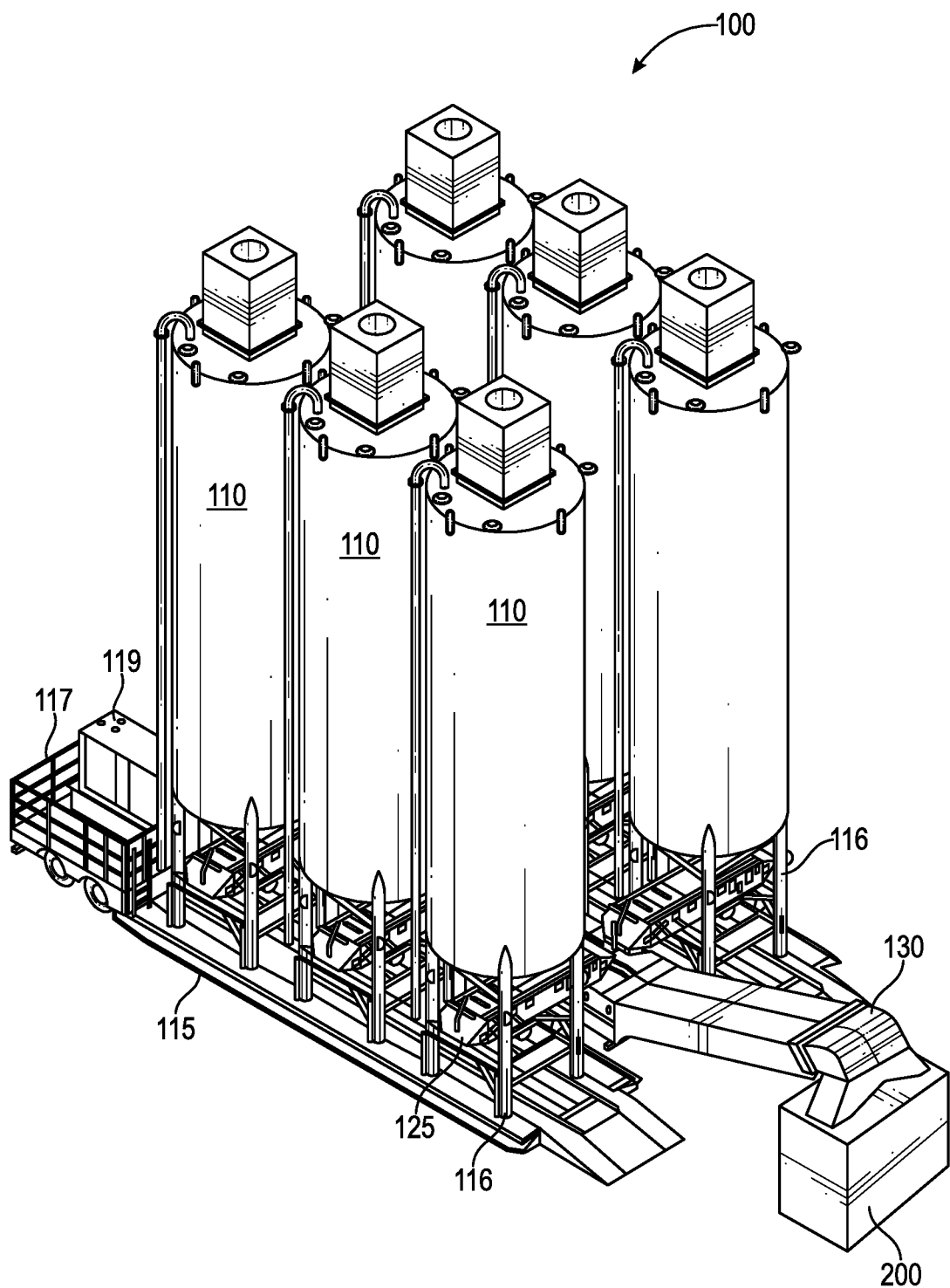

FIG. 2 illustrates one embodiment of an on-site storage system 100 that includes six silos 110, also referred to as storage containers, arranged as two approximately parallel rows of three silos. Each line of three silos are secured to a base platform 115 with an operational section 117 at one end of each platform. A generator or power system 119 allows for the self contained operation of the storage and blending system.

Using the modular storage system 100, the storage and blending system can be expanded in a modular fashion to include additional silos. This modular expansion system allows the user to expand the volume of storage for each component (also referred to herein as an ingredient) of a multi-component composition (also referred to herein as a blend mixture). For example, each modular storage system 100 added provides an additional six silos for storage. Since each silo provides a separate storage compartment, the user can house a different component or ingredient in each silo. Alternatively, for storing large quantities of a component, such as proppant for a fracking job, then each additional six silos greatly increases the on-site storage of a component. For example, if the user is storing proppant on-site an additional six silos provides about 2,500,000 pounds of additional proppant storage, or a twelve silo system enables the pressure pumper to preload about 5,000,000 pounds of proppant or nominally one hundred over-the-road truck-loads. This gives the pressure pumper a competitive advantage in that it eliminates potential delay and demurrage costs by allowing a large on-site inventory of proppant that is immediately available for use.

Managing the Inventory of Blend Materials at the Site

Measuring the silo contents on a real time basis is useful for inventory management, determining and controlling the rate of usage, and avoiding over filling or unexpected empty conditions. Each silo 110 may contain one or more devices for monitoring the level of the silo contents. The monitoring devices 315 may be sonic, radar, optical, inductive or mechanical level monitors.

Determining real time variations in the level, volume or weight of the contents of the silos and transmitting the level of component in each silo to a programmable logic control unit (PLC) that can automatically slow or stop the outflow of component from a particular silo at a pre-determined level, switch silo flows to ensure the uninterrupted flow of the component, or initiate the refilling of the silo to maintain the silo level of component within predetermined limits. The PLC orchestrates the activation, deactivation, and cooperation of the various components of the silo monitoring system.

The software installed on the PLC processes the data received from a Human Machine Interface (HMI) at its control panel, the silo level monitors, the VFDs on the central and secondary feeders, and a secure information processing unit (IPU). The software communicates information and instructions based on the processed data back to the HMI at the control panel, the silo level monitors, the VFDs on the primary and secondary feeders, and the IPU.

Preferred embodiments of the PLC include diversified communications equipment allowing the PLC and/or the IPU to communicate with the Internet and/or an Ethernet. The IPU typically includes at least one of the following communication devices: a modem to allow the system to communicate via a "landline" internet connection (e.g., DSL or cable modem), a satellite antenna and/or a cellular antenna to communicate via a cellular communication tower data connection The IPU communication device is designed to establish and maintain communications with the internet and silo technicians that are authorized to slow or stop the outflow of component from a particular silo at a pre-determined level, activate component flow from a different silo to ensure the uninterrupted flow of the component, or to initiate the refilling of the silo to maintain the silo level of component within predetermined limits.

The silos 110 may contain one or more devices 315 for monitoring the level of their contents. The monitoring devices may be sonic, radar, optical, inductive or mechanical level monitors. Measuring the contents is useful for inventory management, determining and controlling the rate of usage, and avoiding over filling or unexpected empty conditions.

For example, load cells or strain gauges attached to the silo legs 116 may be used to weigh the contents of the silo. Another example of a monitoring device is a pulsed radar monitor positioned inside a silo 110 at the top portion of the silo. The pulsed radar on the top of the silo is used to detect the profile of the granular component in the silo, as it takes the angle of repose of the component into consideration and calculates an effective level, or weight, of the component in the silo.

Figure 4:
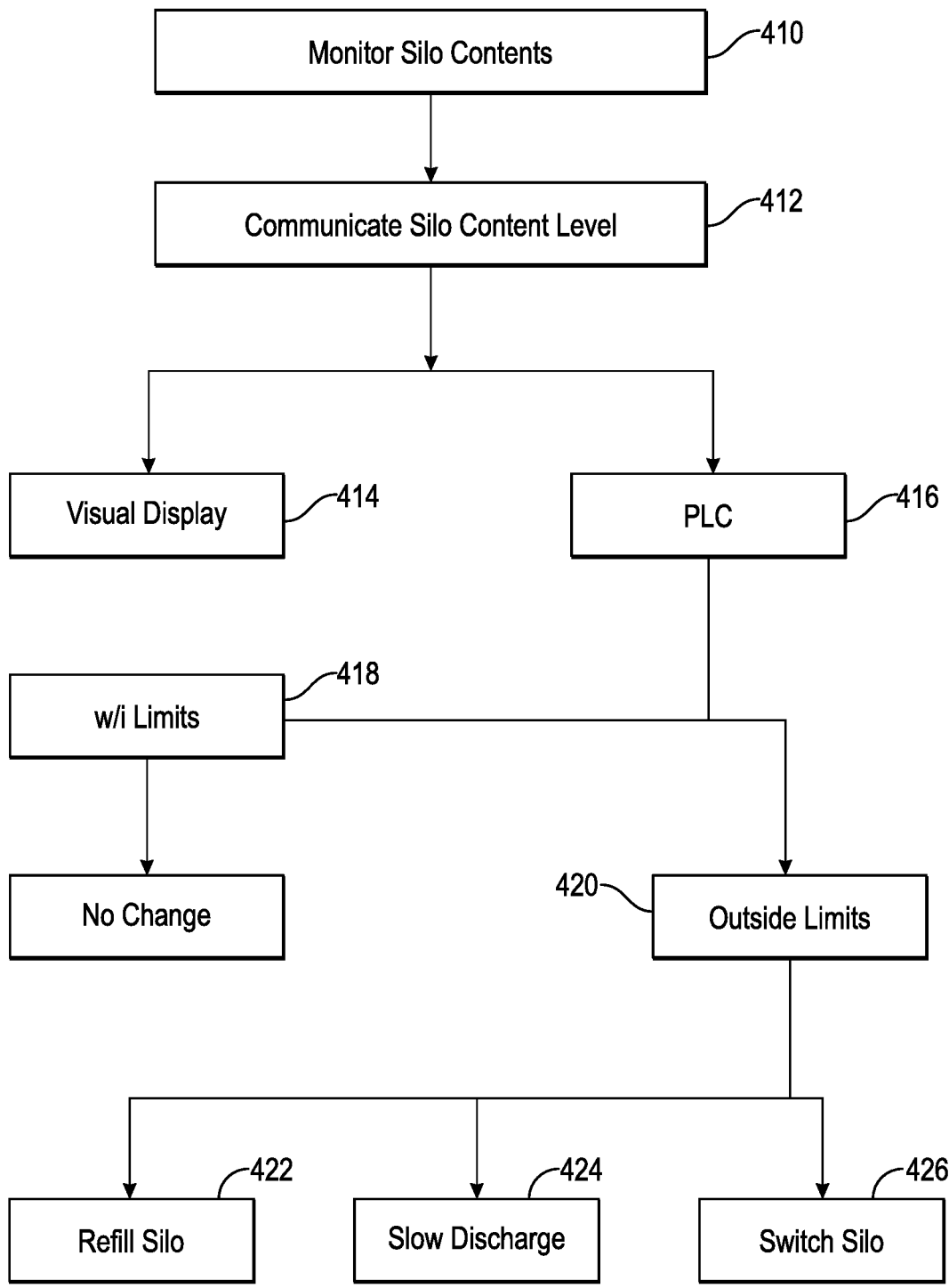

As indicated in FIG. 4, the silo content level may be transmitted by a silo level monitoring device transmitter 315 (also referred to as a silo level transmitter) to a visual display such as a daylight visible LED sign and/or to a human machine interface that is visible to the on-site operator, who can control the content level of the silo through a programmable logic control unit (PLC) either by slowing the discharge of component from the silo, switching to another silo for discharging that component, or start refilling the silo with that component.

Preferred embodiments determine real time variations in the level, volume or weight of the contents of the silos and transmit the level of component in the silo to a PLC that is programmed to automatically slow or stop the outflow of component from a particular silo at a pre-determined level, switch silo flows to ensure the uninterrupted flow of the component, or initiate the refilling of the silo to maintain the silo level of component within predetermined limits. This PLC-based monitoring and automatic operation removes the need to have visual monitoring of each silo or storage container, thereby reducing the number of personnel required at a given site location.

The regulation of the outflow of the component or ingredient from a silo is typically automated as illustrated in FIG. 4. Controlling the inflow of component, or refilling of the silo, may be performed during the operation of the blending system. The silos 110 typically have one or more fill tubes or bucket elevators running up the side of the silo. The fill tubes or bucket elevators facilitate loading the designated granular component into the designated silo. A loading system such as a blower, an in-feed elevator, conveyor, bucket elevator, or the like, is operatively incorporated into fill tube.

FIG. 4 is a flowchart illustrating a process for controlling the content level of components in the one or more silos in which the components are stored. In certain embodiments, the process may be a computer-implemented process (e.g., executable on the electronic control system or PLC). The electronic control system or PLC may implement the process by acquiring real-time operational data from the silo level monitors, evaluating the data against stored predetermined component content limits, minimal and maximal limits, and outputting appropriate control signals in the system.

As illustrated in FIG. 4, the process includes the step of continually monitoring the silo contents level (block 410). The silo levels are communicated (block 412) to a visual display (block 414) and/or to a programmable logic control device (PLC) (block 416). Thus, the PLC constantly acquires real-time silo content level data from the silo level monitors, evaluates the data against stored predetermined component content limits, minimal and maximal limits, and outputs appropriate control signals in the system. If the content level data is within the programmed prescribed limits (block 418) then the PLC will not initiate any change in the blending system. If on the other hand, the silo level contents pass outside of the prescribed limits (block 420), then the PLC sends an alert to the silo technician and/or the system operator. The silo technician or the system operator is responsible for ensuring that the situation is addressed either manually by the silo technician or as instructed by the PLC to initiate refilling the silo (block 422), slowing the discharge from the silo (block 424) by instructing the variable frequency drives (VFDs) of the primary and secondary feeders to slow, or to automatically turn off the lead or secondary feeder from the silo with a content level outside of the prescribed limits and to activate the discharge of that component from another silo (block 426).

Managing Inflow/Outflow of Blend Materials to the Blender

Figure 3:
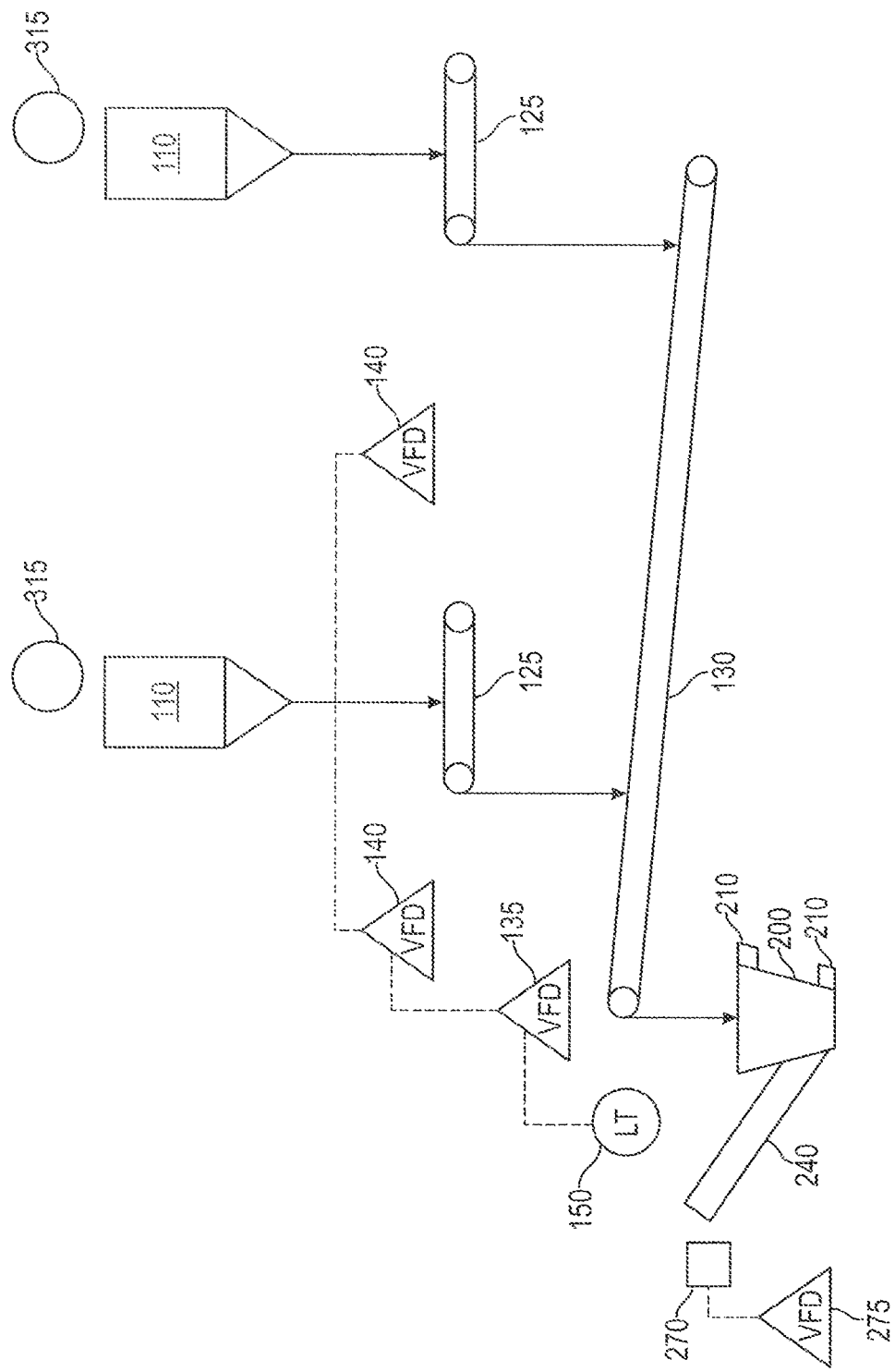

One embodiment of the storage system 100 for multi-component granular materials as described herein is shown in FIGS. 1-3. This embodiment includes multiple vertically standing storage containers for storing ingredients of the blend mixture on-site, a primary or central feeder 130 for feeding the ingredients into the hopper blender 200, one or more secondary or ingredient feeders 125 for dispensing a predetermined quantity of one or more different ingredients from one or more designated storage containers 110 to the primary feeder 130, one or more hopper blender level monitors that tracks the level of material in the hopper blender 200 and a hopper blender inflow monitor 150 that measures the exact amount of material entering the hopper blender 200, wherein the level of material flowing into the blender is controlled by the feed rate of the primary 130 and secondary feeders 125. The feed rate of the primary feeder 130 is controlled by a primary or central feeder regulator 135, the feed rate of the secondary feeders 125 is controlled by secondary or ingredient feeder regulators 140. The system, either in whole or in part, can be controlled either manually or electronically.

An on-site blending system allows oil field personnel to blend two or more products with precision. This enables pressure pumpers to precisely blend products for specific well designs that call for a blend of proppants such as a coated sand of a specific color with another proppant, a sand that is chemically coated with a traceable tag to allow the proppant to be traced down hole, or a blend of proppant and other bulk solid additives for tracking proppant position or performance.

FIG. 2 depicts one embodiment of two rows of three silos 110 positioned side-by-side on a base platform 115. Also depicted are shuttle conveyors 125 which are located under the exit ports beneath each silo 110 such that the shuttle conveyor 125 may be used to transfer material stored in one or more silos 110 onto a dual belt conveyor 130 or other receiving mechanism that delivers the material to a hopper or blender hopper 200.

The six silos 110 vertically positioned on two separate neighboring base platforms 115 in a "six pack" configuration. In between the two rows of three silos is a central conveyor system 130, or primary feeder, that is fed by the shuttle conveyors 125, serving as secondary feeders beneath the silos. The speed of the central conveyor system 130 as well as the shuttle conveyors 125 may be electronically controlled using a variable frequency drive that allows for the remote control of variation in the speeds of the conveyors. The central conveyor system 130 is used to transport the material stored in the silos 110 into a hopper or blender hopper 200. Any number of silos can be employed at the site by adding additional six pack configurations.

In preferred embodiments, the blending system illustrated in FIG. 3 is designed to maintain a constant level and supply of component (which is adjustable) from the one or more silos to the blender hopper 200 that feeds an on-site operation, such as a frac job. Since the system is designed to monitor granular solids amounts in real time, the system can furnish the rate at which one or more components are being removed from one or more silos, as well as the rate of ingredient delivery into the hopper originating from the one or more silos.

In order to maintain an efficient on-site operation, it is necessary to control the rate that the blended mixture is being removed from the blender hopper 200 and to balance that exit rate with the total inflow rate that the various components are being delivered to the blender hopper. In a frac job, for example, a large amount of the blended proppant is continuously being pumped into the well from the blender 300 so in order that the frac job is not interrupted due to the availability of the blended proppant, the rate at which each component of the blend mixture is released from the silos and delivered into the blender hopper 200 must be carefully regulated. In certain embodiments, flow of components from each silo is controlled using detectors and is automated by a programmable logic control unit (PLC).

The central or primary feeder 130 and the secondary feeders 125 may be a variety of regulatable dispensers. For example, discharge chutes, gate valves, vibratory dispensers, augers or conveyors having adjustable speeds that can provide a regulatable feed rate from zero to a predetermined maximum flow of a particular component from a silo.

Conveyors, such as the central conveyor or shuttle conveyors described above, serve as preferred primary and secondary feeders since they move material, such as sand or other solid granular material, horizontally. This allows a lower overall installed height than using conventional inclined chutes or augers. Variable frequency drives are optionally installed to allow control of the speed of the shuttle and central conveyors and thus the component feed rate into the blender hopper. As illustrated in FIG. 2, a shuttle conveyor 125 is typically positioned below each silo 110 on the base platform 115. The speed of each conveyor is remotely controlled via a digital electronic system, providing precise control of the discharge rate of each component of the proppant to match the required flow of each material at the site operation.

A preferred embodiment of the primary or central feeder 130 is a dual belt conveyor. The dual belt conveyor and the shuttle conveyors typically have variable frequency drives (VFD) or other feeder regulators. The gentle transitions of the components from the shuttle conveyors to the dual belt conveyor limit the sifting segregation of the blend materials as they are dispensed from the silos 110 to the blender hopper 200. A thorough mixing of all of the blend materials or components is performed inside the blender hopper 200. Since the level of material in the blender hopper is important, it is continuously monitored either by a designated operator or automatically by a level monitor.

One or more level monitors 210 track the level of material in the blender hopper at all times. A top level monitor and/or a bottom monitor is used to monitor the level of material within the blender hopper. A top level monitor 210 is typically positioned at the top of the blender hopper to monitor the level of material in the blender and communicate the level of material to a blender hopper controller 250. The top level monitor 210 may be a sonic, radar, optical, inductive or mechanical level monitor. Preferred embodiments use a level sensing laser, a guided wave radar, a non-contact radar, or a pulsed radar device to constantly monitor the level of material in the blender. Generally, a bottom level monitor 2'0 is a mechanical level monitor such as a load cell that communicates the weight of the blender hopper contents (in kilograms or tons) to a blender hopper controller 250.

The quantity of each blend component dispensed from a silo 110 to a secondary feeder 125 and to the primary or central feeder 130 is controlled by regulating the feeder regulator of the secondary feeder 140 and the feeder regulator 135 of the primary or central feeder in order to increase or slow their output speeds. The level transmitter will communicate to the feeder regulators of the secondary and primary feeders in order to increase or slow their speeds so that the level of material in the hopper is adjusted and maintained within predetermined limits. To ensure that the exact amount of inflowing material into the hopper is measured and communicated to a hopper control system, the rate of inflow into the blender hopper can be measured by a monitor 150 positioned at the end of the central feeder 130 or attached to the top of the blender hopper 200. The hopper inflow monitor 150 monitors the exact quantity of material that drops into the blender hopper from the distal end of the primary conveyor into the blender hopper.

The hopper inflow monitor 150 may be a sonic, radar, optical, inductive, or mechanical monitor. Some embodiments of the hopper inflow monitor use a visual sensing laser, a guided wave radar, a non-contact radar, or a pulsed radar device to constantly monitor the amount of material entering the blender. One embodiment of the hopper inflow monitor 150 uses a load cell under the distal end of the central conveyor and a speed sensor that measures the speed of the central conveyor 130. A blender controller 250 determines the exact amount of material passing over the distal end of the conveyor into the blender from the primary shuttle load cell readings and the speed sensor readings by totaling the weight of material passing over the load cell per a set time period.

The rate of inflow and outflow of solid materials into and out of the blender hopper 200 must be carefully measured and balanced. In order to get the exact real time rate of outflow of material from the blender hopper, a regulatable dispenser 240 is used to control the dispensing of solid material from the blender hopper 200 into the blender 300. For example, discharge chutes, gate valves, vibratory dispensers, augers or conveyors having adjustable speeds that can provide a regulatable feed rate from zero to a predetermined maximum flow of material out of the blender hopper.

A blender hopper dispenser regulator 270, such as a motor governing the speed of the hopper dispenser 240, is used to determine real time exact outflow rates of solid material from the blender hopper 200 into the blender 300. The regulatable hopper dispenser 240 is used to measure, regulate and control the rate of outflow of material from the blender hopper. One embodiment of the hopper dispenser 240 is an auger. The hopper dispenser 240 is typically regulated by a dispenser regulator 270 having a variable frequency drive (VFD) 275 or other regulator. For example if an auger is used as the hopper dispenser, the outflow rate of material from the blender hopper is controlled by regulating the turn rate of the auger and thus the exact rate of outflow of material.

A blender hopper controller 250 is used to balance and control the inflow and outflow rates of material into and out of the hopper blender. As seen in FIG. 1, the blender hopper controller 250 communicates with the primary and secondary feeders 125, 130; the blender hopper inflow monitor 150; the hopper blender dispenser 240; and the blender controller 350. The hopper controller 250 continually balances the inflow and outflow of material into and out of the blender hopper.

In certain embodiments, the blender hopper control process may be a computer-implemented process (e.g., executable on the electronic control system or PLC). The blender hopper controller control system may implement the process by acquiring real-time operational data from the blender inflow monitor 150 and outflow dispenser 240, evaluating the quantity of component inflow and outflow into and from the blender hopper and balancing the rate of inflow of components into the blender hopper with the rate of outflow of the blended mixture from the blender hopper 200. This balancing of the inflow and outflow involves controlling the dispensing of material into the blender hopper and the outflow of material out of the blender hopper.

The inflow of material into the blender hopper is controlled by the feedback regulation of the speed of dissemination of each component from a silo within certain predetermined limits onto the central feeder and the real time rate of inflow of material from the central feeder 130 into the blender hopper 200. Thus, the rate of inflow of materials into the hopper is controlled by speeding up or slowing down the primary and secondary feeders and therefore the rate of dispensing the components into the blender hopper. The outflow of the blend mixture from the hopper blender is similarly controlled by regulating the hopper dispenser 240.

Managing Inflow/Outflow of Blend Materials to the Blender

As shown in FIG. 1, the hopper outflow dispenser 240 delivers the blend mixture directly from the hopper 200 into a blender 300 based on the liquid flow rate into the blender and the blender slurry flow rate exiting the blender. It is important that there is tight control over the exact amount of granular material entering the blender. This is accomplished using a variable hopper outflow dispenser and a hopper outflow monitor that calculates the hopper outflow based on the speed of the outflow dispenser 240 and the amount of blend material delivered per unit of time by the hopper outflow dispenser.

A blender controller 350 controls the speed of the hopper outflow dispenser based on the amount of granular material required to enter the blender per a designated time period. The entry rate of granular material into the blender is controlled to match the entry rate of fluid into the blender and a programmable setpoint of solid/fluid ratio. The entry rate of fluid into the blender 300 is typically controlled by a suction pump and measured by a blender fluid flow meter 680.

Once the blend mixture and fluid enter the blender 300, the blender blends the granular material and fluid to form a fracturing fluid slurry. The blending process is typically performed by a mixing process that is designed to quickly and thoroughly mix the contents of the blender using a mixing device inside the blender into a homogenous fracturing fluid slurry. The exit rate for the fracturing slurry is controlled by a discharge pump that provides an adequate charge pressure for the frac pump. The exit rate of the fracturing slurry is measured by the blender slurry flow meter 700 and is balanced with the inflow of the blend mixture and fluid.

Hopper Control System

Currently, most systems have the rate of delivery of solid components into the hopper controlled manually. During a hydraulic fracturing process, it is important that the level on material in the blender hopper is carefully controlled. If solid components are delivered too quickly to the hopper then the hopper will overflow causing a number of safety and environmental issues on the job site. Yet if the solid material is delivered too slowly, then the hopper risks running dry diminishing the concentration of proppant being pumped down the well and compromising the productivity of the well. The hopper control system provides a method for balancing the inflow and outflow of material into and out of the hopper.

Figure 5:
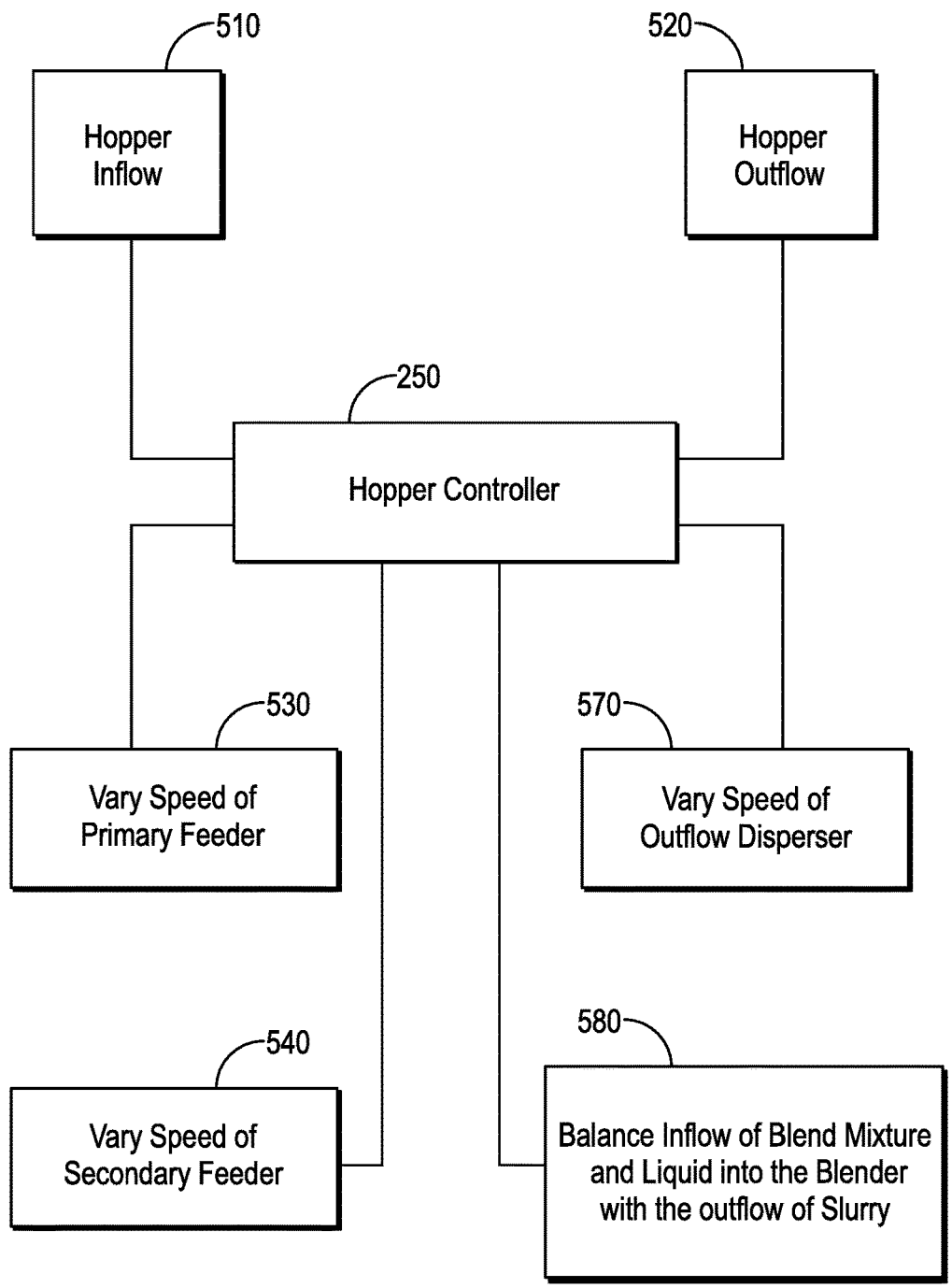

The hopper controller 250 balances the flow of material into and out of the blender hopper 200. One embodiment of a hopper control system is illustrated in FIG. 5. The hopper controller controls the hopper inflow (step 510) by varying the speed of the primary (step 530) and secondary feeders (step 540) as previously described. The hopper controller (step 250) controls the hopper outflow of blend material by varying the speed of the hopper outflow dispenser (step 570). The hopper controller varies the speed of the hopper outflow dispenser to balance the hopper inflow and outflow of material while taking into account the amount of blend material needed to enter the blender to take in account the inflow of fluid into and the outflow of slurry out of the blender (step 580).

A method for balancing the inflow and outflow of material into and out of a hopper during a fracking job is set out herein. The method includes the steps of (a) providing the hopper with a hopper inflow monitor positioned proximal an entrance to the hopper; (b) measuring a mass or amount of granular material entering the hopper; (c) providing the hopper with a regulatable hopper outflow dispenser that delivers the granular material from the hopper to a blender; (d) measuring a mass or amount of granular material required by the blender to produce a set amount of fracturing slurry to pump into a well; (e) regulating the hopper outflow dispenser to deliver the mass or amount of granular material required by the blender from the hopper to the blender; (e) balancing the mass or amount of granular material entering the hopper with the mass or amount of material delivered to the blender.

The monitoring and operating technology of the current invention is PLC-based and removes the need to have visual monitoring of the silos, primary and secondary feeders, or the blender hopper. The PLC-based operating technology reduces the number of technicians required at a given site location and the costly side effects of potential human mistakes. Preferred embodiments of the automated storage and blending system only requires one technician to operate the entire system, whereas conventional systems require up to six on-site technicians. The PLC-based storage and blending system allows the on-site technician or operator to adjust and change the blending of components through an on-site human machine interface (HMI) to meet the changing needs of the on-site operation.

In certain embodiments, the process may be a computer-implemented process (e.g., executable on the electronic control system or PLC). The PLC may implement the process by acquiring real-time operational data from the central and shuttle conveyors, the silo monitors; the hopper inflow monitor; the hopper outflow monitor; and the blender controller.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The foregoing provides a detailed description of the invention which forms the subject of the claims of the invention. It should be appreciated by those skilled in the art that the general design and the specific embodiments disclosed might be readily utilized as a basis for modifying or redesigning the natural gas supply system to perform equivalent functions, but those skilled in the art should realized that such equivalent constructions do not depart from the spirit and scope of the invention as set forth in the appended claims.

What is claimed is:

1. A blending system comprising:
   (a) a hopper that blends at least two granular ingredients into a blend mixture;
   (b) a blender that blends the blend mixture received from the hopper with a liquid to form a fracturing fluid slurry;
   (c) a plurality of storage containers, wherein at least one storage container contains each ingredient of the blend mixture;
   (d) a central feeder oriented such that a first end of the central feeder is positioned to deliver the ingredients of the blend mixture directly into the hopper;
   (e) an ingredient feeder designated for each ingredient in the blend mixture, each ingredient feeder oriented to deliver the ingredient exiting from one storage container to the central feeder;
   (f) a plurality of ingredient feeder regulators, wherein one ingredient regulator controls the rate of delivery of each ingredient feeder from its ingredient feeder to the central feeder;
   (g) a central regulator that controls the speed of the central feeder and the rate of delivery of the ingredients from the central feeder into the hopper;
   (h) a hopper inflow monitor positioned at the first end of the central feeder to measure an amount of blend ingredients entering the hopper;
   (i) a variable hopper outflow dispenser that delivers the blend mixture into the blender;
   (j) a hopper outflow regulator that controls an exit rate of the blend mixture from the hopper by controlling a speed of the hopper outflow dispenser, wherein the exit rate of the blend mixture from the hopper is regulated based on the amount of granular material required to match the entry rate of liquid entering the blender to achieve a programmable setpoint of solid/fluid ratio in the blender, and wherein an amount of fracturing fluid slurry exiting the blender equals the amount of granular material and liquid entering the blender; and
   (k) a hopper control system in communication with the feeder regulators, the hopper inflow monitor, and the hopper outflow regulator, wherein the hopper control system matches the delivery rate of each of the ingredients into the hopper proportionately with the designated percentage of that ingredient within the blend mixture and matches the delivery rate of the blend mixture into the hopper with the exit rate of the blend mixture from the hopper.

2. The blending system of claim 1, further comprising a blender controller in communication with a blender fluid flow meter and the hopper control system.

3. The blending system of claim 2, wherein the exit rate of the fracturing fluid slurry is measured by a blender outflow meter.

4. The blending system of claim 3, wherein the blender controller is in communication with the blender outflow meter.

5. The blending system of claim 1, wherein the hopper outflow regulator is a variable frequency drive in communication with a motor that runs the hopper outflow dispenser.

6. The blending system of claim 4, wherein the blender controller matches the amount of fracturing fluid slurry exiting the blender with the amount of granular material and liquid entering the blender.

7. The blending system of claim 2, wherein the hopper control system in coordination with the blender controller regulates the ingredient and central regulators.

8. The blending system of claim 7, wherein the blender control system in coordination with the hopper controller governs the delivery rate of the blend mixture into the blender.

9. A blending system comprising:
   (a) a hopper that blends at least two ingredients into a blend mixture;
   (b) a flat platform positioned on a ground surface and configured for a trailer to drive upon;
   (c) a plurality of storage containers, each container vertically positioned on the platform on a set of legs and equipped with a storage container monitoring device that dynamically monitors a level, mass or amount of an ingredient contained in that storage container and a discharge exit port oriented on a lower end of the container toward the platform and among the legs, wherein at least one storage container contains each ingredient of the blend mixture;
   (d) a choke gate mounted on the exit port of each container, wherein an adjustable opening of the choke gate controls a discharge rate of the ingredient through the exit port of each container;
   (e) a central feeder oriented proximal to and parallel to the platform, wherein the hopper is positioned at a first end of the central feeder such that the central feeder delivers the ingredients of the blend mixture into the hopper;
   (f) at least one ingredient feeder designated for each ingredient in the blend mixture, each ingredient feeder mounted below one container choke gate and oriented to deliver the ingredient exiting from the choke gate of that storage container to the central feeder;
   (g) a central regulator that regulates a variable delivery rate of the blend mixture from the central feeder into the hopper;
   (h) a plurality of ingredient regulators, with at least one ingredient regulator designated for each ingredient feeder, where each ingredient regulator regulates a variable delivery rate of the ingredient from its ingredient feeder to the central feeder;
   (i) a hopper monitor positioned proximal the first end of the central feeder wherein the hopper monitor measures a level, mass or amount of the blend mixture entering the hopper or within the hopper (j) an adjustable hopper outflow dispenser that varies an exit rate of the blend mixture from the hopper to a blender, wherein the exit rate of the blend mixture from the hopper is regulated based on the amount of granular material required to match the entry rate of fluid into the blender and a programmable setpoint of solid/fluid ratio in the blender;

(k) a hopper control system in communication with the hopper monitor, the hopper outflow dispenser, the storage container monitoring devices, each ingredient feeder regulator, and the central feeder regulator, wherein the control system is configured to dynamically balance the delivery rate of the blend mixture into the hopper with the exit rate of the blend mixture from the hopper and to regulate each ingredient feeder regulator to adjust the delivery rate of each of the ingredients onto the central feeder to equal a designated percentage of that ingredient within the blend mixture;

(l) a blender that blends the blend mixture received from the hopper with a liquid to form a fracturing fluid slurry; and (m) a blender controller in communication with a blender fluid inflow meter, a blender outflow meter, and the hopper control system.

10. The blending system of claim 9, further comprising a hopper outflow regulator.

11. The blending system of claim 10, wherein the blender controller matches the amount of fracturing fluid slurry exiting the blender with the amount of blend mixture and liquid entering the blender.

12. The blending system of claim 11, wherein the ingredient regulators and the hopper outflow regulator are variable frequency drives in communication with a set of motors that run the central and ingredient feeders and the hopper outflow dispenser.

13. The blending system of claim 12, wherein the hopper control system in coordination with the blender controller calculates a remote set point for an appropriate speed for the hopper outflow dispenser and for each ingredient feeder based on the dimensions of the choke gate opening and a desired blend ratio in decimals of the ingredient within the blend mixture.

14. The blending system of claim 11, wherein the hopper control system in coordination with the blender controller calculates a remote set point for an appropriate speed for the hopper outflow dispenser to supply a desired amount of the blend mixture to the blender.

15. The blending system of claim 14, wherein the exit rate of the blend mixture from the hopper is regulated based on the amount of blend mixture required to match the entry rate of liquid entering the blender to achieve a programmable setpoint of solid/fluid ratio in the blender.

16. The blending system of claim 9, wherein the hopper outflow dispenser is an auger.

17. A method for balancing the inflow and outflow of material into and out of a blender during a fracking job comprising:

(a) providing a blender with a fluid inflow monitor to measure an amount of fluid entering the blender;

(b) providing a regulatable pump to deliver the fluid into the blender;

(c) providing a regulatable hopper outflow dispenser that delivers a blend mixture from a hopper to the blender;

(d) calculating a mass or amount of blend mixture required by the blender to achieve a predetermined setpoint of solid/fluid ratio in the blender;

(e) regulating a regulatable hopper outflow dispenser to deliver the calculated mass or amount of blend mixture from a hopper to the blender;

(f) balancing the mass or amount of blend mixture and fluid entering the blender with a mass or amount of fracturing slurry exiting the blender.

18. The method of claim 17, providing a blender controller in communication with the blender fluid inflow monitor, a blender outflow meter, and a hopper control system.

19. The method of claim 18, wherein the hopper control system regulates the hopper outflow dispenser.

20. The method of claim 19, wherein the blender controller in coordination with the hopper control system regulate the delivery of the blend mixture and fluid into the blender and the outflow of the fracturing slurry from the blender.

* * * * *